(12) United States Patent
Lu et al.

(10) Patent No.: US 8,254,704 B2
(45) Date of Patent: Aug. 28, 2012

(54) REMOTE COMPUTING PLATFORMS PROVIDING HIGH-FIDELITY DISPLAY AND INTERACTIVITY FOR CLIENTS

(75) Inventors: Yan Lu, Beijing (CN); Huifeng Shen, Beijing (CN); Feng Wu, Beijing (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 760 days.

(21) Appl. No.: 12/408,611

(22) Filed: Mar. 20, 2009

(65) Prior Publication Data

US 2010/0111410 A1 May 6, 2010

Related U.S. Application Data

(60) Provisional application No. 61/109,571, filed on Oct. 30, 2008.

(51) Int. Cl.
*G06K 9/36* (2006.01)
(52) U.S. Cl. ......... 382/232; 382/233; 382/224; 382/236
(58) Field of Classification Search .................. 382/166, 382/162, 232, 236, 130, 224, 233; 715/721, 715/723; 711/112; 725/112, 115, 34, 64, 725/51, 136; 128/922; 600/454; 375/240.16, 375/E7.125
See application file for complete search history.

(56) References Cited

U.S. PATENT DOCUMENTS

| | | | |
|---|---|---|---|
| 4,443,863 A | 4/1984 | Busch et al. | |
| 6,014,133 A | 1/2000 | Yamakado et al. | |
| 7,171,444 B2 | 1/2007 | Deshpande | |
| 7,376,278 B2 | 5/2008 | Iwamura | |
| 7,430,681 B1 | 9/2008 | Hobbs | |
| 2004/0010622 A1 | 1/2004 | O'Neill et al. | |
| 2004/0249980 A1 | 12/2004 | Hutler et al. | |
| 2007/0268824 A1 | 11/2007 | Kodaka et al. | |
| 2008/0215671 A1 | 9/2008 | Ruxi | |

FOREIGN PATENT DOCUMENTS

JP    02003001688 A  *  1/2003

OTHER PUBLICATIONS

PCT International Search Report for Application PCT/US2009/062863, Issued Jun. 15, 2010.
PCT International Preliminary Report on Patentability for Application PCT/US2009/062863, Issued May 3, 2011.

(Continued)

*Primary Examiner* — Anh Hong Do
(74) *Attorney, Agent, or Firm* — Lyon & Harr, LLP; Mark A. Watson

(57) ABSTRACT

A "Remote Display Generator," as described herein, provides various techniques for providing high-fidelity displays with highly responsive interactive application experiences to clients across a wide range of network bandwidths for remotely hosted applications. In general, the Remote Display Generator uses a compression-friendly remote display architecture as a core. With this compression architecture, actual screen data from a remote server is read out from the display buffer frame by frame, and then compressed with a unified screen codec. Other technologies, including timer-driven screen update models and adaptive transmission mechanisms, are then integrated with various embodiments of the Remote Display Generator to improve overall user experience by improving display quality and responsiveness to user interaction with remotely hosted applications.

20 Claims, 12 Drawing Sheets

OTHER PUBLICATIONS

Montagnat, et al., "Efficient Visualization of 3D Medical Scenes for Remote Interactive Applications", 3rd International Symposium on Image and Signal Processing and Analysis, retrieved at <<http://www.i3s.unice.fr/~johan/publis/ISPA03.pdf>>, Sep. 18-20, 2003, pp. 6.

"Rysavy & Associates", "TCP/IP: The Best Protocol for Remote Computing", retrieved at <<http://www.rysavy.com/Articles/remote.htm>>, Oct. 31, 2008, pp. 13.

Baratto, et al., "MobiDesk: Mobile Virtual Desktop Computing", Columbia University Technical Report CUCS-014-04, retrieved at <<http://www1.cs.columbia.edu/~library/TR-repository/reports/reports-2004/cucs-014-04.pdf>>, Mar. 2004, pp. 1-18.

Jiang, et al., "A Novel Remote Screen Synchronization Mechanism for Ubiquitous Environments", 1st International Symposium on Pervasive Computing and Applications, 2006, retrieved at <<http://grid.hust.edu.cn/zyshao/Publications/SPCA06-00365-cameraready.pdf>>, Aug. 3-5, 2006, pp. 1-6.

Scheifler, et al., "The X Window System", ACM Transactions on Graphics (TOG), retrieved at <<http://delivery.acm.org/10.1145/30000/24053/p79-scheifler.pdf?key1=240538&key2=2965345221& coll=GUIDE&dl= GUIDE&CFID=8534840&CFTOKEN=87600115>>, vol. 5, No. 2, 1986, pp. 79-109.

"Remote Desktop Protocol", retrieved at <<http://msdn.microsoft.com/en-us/library/aa383015.aspx>>, Oct. 23, 2008, pp. 3.

Richardson, et al., "Virtual Network Computing", Reprint from IEEE Internet Computing, retrieved at <<http://www.cl.cam.ac.uk/research/dtg/attarchive/pub/docs/att/tr.98.1.pdf>>, vol. 2, No. 1, Jan./Feb. 1998, pp. 32-38.

Kaplinsky, Konstantin V., "VNC Tight Encoder—Data Compression for VNC", Modern Technique and Technologies, retrieved at <<http://ieeexplore.ieee.org/stamp/stamp.jsp?arnumber=983781&isnumber=21203>>, 2001, pp. 155-157.

Baratto, et al., "THINC: A Remote Display Architecture for Thin-Client Computing", Columbia University Technical Report CUCS-027-04, retrieved at <<http://www.cs.columbia.edu/techreports/cucs-027-04.pdf>>, 2004, pp. 15.

* cited by examiner

REMOTE COMPUTING PLATFORMS PROVIDING HIGH-FIDELITY DISPLAY AND INTERACTIVITY FOR CLIENTS

CROSS-REFERENCE TO RELATED APPLICATIONS

This application claims the benefit under Title 35, U.S. Code, Section 119(e), of a previously filed U.S. Provisional Patent Application Ser. No. 61/109,571 filed on Oct. 30, 2008, by Yan Lu, et al., and entitled "Titanium Remote Platform".

BACKGROUND

1. Technical Field

A "Remote Display Generator," provides various techniques for implementing remote computing platforms that provide clients remote access to various applications, and in particular, various techniques for providing high-fidelity displays with highly responsive interactive application experiences to clients across a wide range of network bandwidths for remotely hosted applications.

2. Related Art

Rapid development of the network bandwidth provides opportunities for users to utilize remote computing resources for a number of purposes. For example, portable or network attached devices can be used to access and interact with applications with heavy resource requirements that are hosted by powerful machines at remote sites. In addition, wide network bandwidths and pervasive computing environments are useful for the deployment of the Software as a Service (SaaS) model. In the SaaS model of software consumption, the software is provided to consumers as a service across the Internet or other network and the applications are hosted by remote servers. Consequently, at the client side, users can eliminate software installation and maintenance, and use thin-client computing platforms to access the software services provided by remote servers.

More specifically, typical remote computing platforms decouple the application logic from the user interface, and enable clients to utilize the computation resources from one or more remote servers. In the development of these types of remote computing systems, a number of factors are generally considered, including for example, richness of the user experience, bandwidth consumption, and cross platform adaptation.

For example with respect to overall user experience, users of remote computing platforms expect (or demand) high-fidelity displays and an interactive experience that operates in the same manner as if the users were accessing those same applications running on the local machines.

Overall application performance that is acceptable to the user is required not only in LAN environments (where high bandwidth is generally readily available) but also in bandwidth-constrained WAN environments. Unfortunately, complicated graphical interfaces and multimedia applications often produce difficult technical challenges for developers in achieving effective transmissions with low-bandwidth links.

Finally, as technology becomes more pervasive in the everyday environment, more and more consumer electronic devices such as laptops, smart phones, media players, home appliances, etc., can easily access the Internet. Such devices may be quite different in terms of access bandwidth and operating systems. Consequently, another challenge facing developers of these devices and associated applications is to make such devices operate in a manner that is acceptable to users of remote applications, especially in the case of multimedia applications where video quality is often a primary concern of the user.

Towards addressing such issues, a number of thin-client computing platforms have been developed in the past. In general, these existing systems can be classified into two categories according to the mechanisms of representing the display information.

For example, the first category of remote computing systems typically uses high-level commands to represent the screen update, such as, for example, an application known as "X System", and Microsoft® Remote Desktop Protocol (RDP). These methods are efficient in representing the display of the graphical user interface (GUI). However, such systems tend to suffers from performance degradation, especially when representing display-intensive multimedia applications (e.g., video playback). In addition, the interpretation of high-level commands depends heavily on the operating systems. Consequently, it is a difficult to develop applications for servers and clients on different operating systems having different display rendering mechanisms.

The second category of remote computing systems generally utilizes low-level approaches to represent the screen of remote servers, including the well-known VNC and THINC type systems. VNC-based systems generally operate by directly reading pixels from the framebuffer of the server, and then compressing these pixels for transmission to the client. Well-known encoding schemes for pixel compression with such systems include the ZRLE method and the Tight encoding method. However, such methods are not generally effective for compressing display screens having high spectral contents. For example, the THINC system intercepts graphics calls of the server and maps them to low-level simple commands. However, this system lacks efficient compression mechanisms for display-intensive applications such as video playback.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A "Remote Display Generator," as described herein, presents various techniques for providing high-fidelity displays with highly responsive interactive application experiences to clients across a wide range of network bandwidths for remotely hosted applications. In general, the Remote Display Generator uses a compression-friendly remote display architecture as a core. With this compression architecture, actual screen data from a remote server is read out from the display buffer frame by frame, and then compressed with a unified screen codec.

Other technologies, including timer-driven screen update models and adaptive transmission mechanisms, are then integrated with various embodiments of the Remote Display Generator to improve overall user experience by improving display quality and responsiveness to user interaction with remotely hosted applications.

More generally, the Remote Display Generator allows a plurality of clients to connect to one or more remote hosts to display and interact with one or more concurrent applications. Various embodiments of the screen image compression techniques provided by the Remote Display Generator use of blocks of non-overlapping pixels that are evaluated and identified as a particular type, with each type of pixel block then being compressed using a corresponding image compression process. Compressed pixel blocks are then encoded and transmitted to the client or clients.

In further embodiments, compression efficiency is further improved by comparing pixel blocks in prior and current image frames to determine which pixel blocks have not changed. Unchanged pixel blocks are marked as unchanged blocks, and are not compressed or encoded, except to use a minimal amount of bits to indicate to the client that the blocks are not changed relative to the prior image frame. This block based difference detection process serves to further reduce bandwidth requirements and computational overhead on the server or host, thereby allowing the host to service a larger number of concurrent clients.

In view of the above summary, it is clear that the Remote Display Generator described herein provides various techniques for providing high-fidelity displays with highly responsive interactive application experiences to clients across a wide range of network bandwidths for remotely hosted applications. In addition to the just described benefits, other advantages of the Remote Display Generator will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

A "Remote Display Generator," as described herein, provides various techniques for providing high-fidelity displays with highly responsive interactive application experiences to clients across a wide range of network bandwidths for remotely hosted applications.

In general, the Remote Display Generator uses a compression-friendly remote display architecture as a core. With this compression architecture, actual screen data from a remote server is read out from the display buffer frame by frame, and then compressed with a unified screen codec. Other technologies, including timer-driven screen update models and adaptive transmission mechanisms, are then integrated with various embodiments of the Remote Display Generator to improve overall user experience by improving display quality and responsiveness to user interaction with remotely hosted applications.

Figure 1:
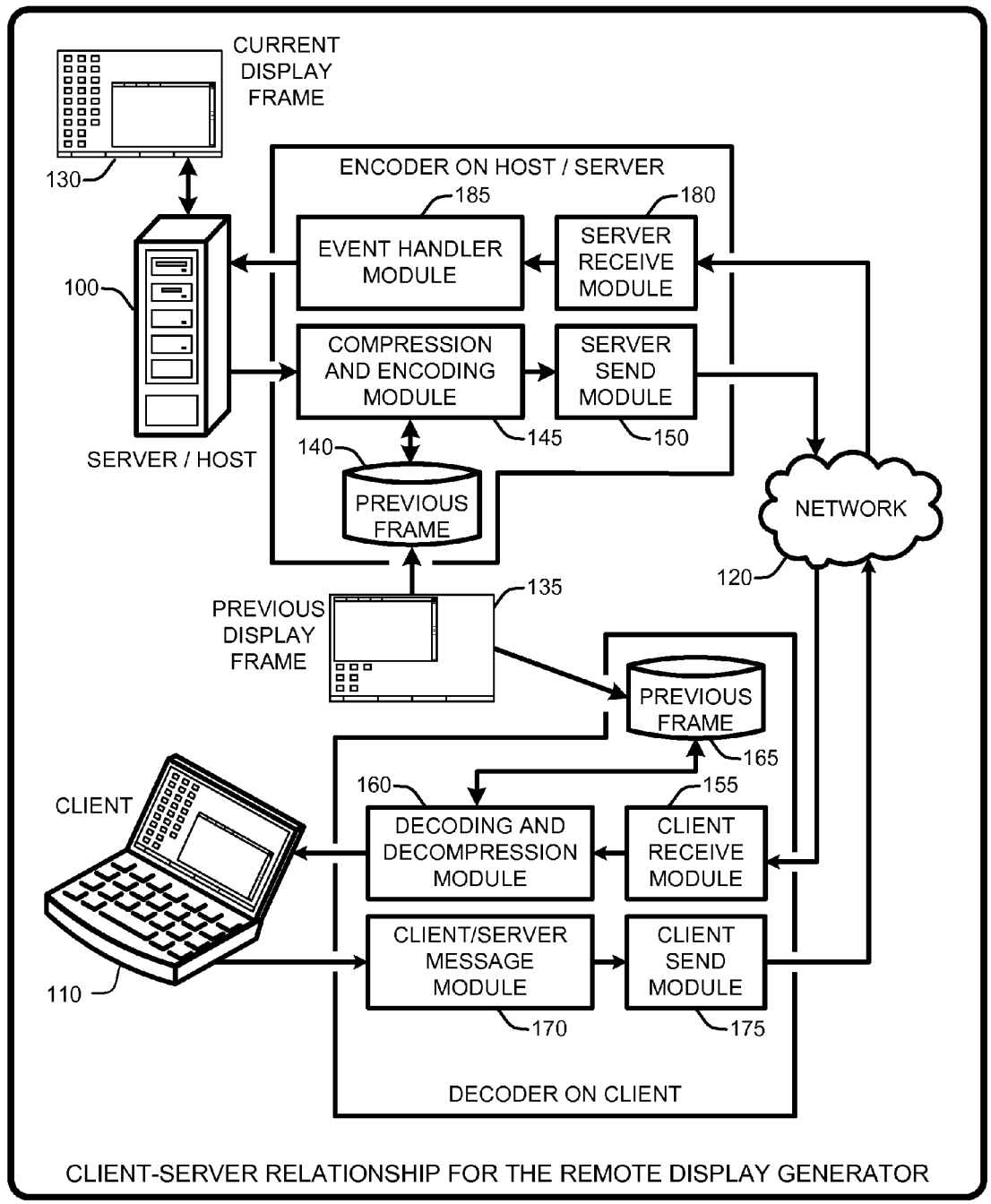
FIG. 1 provides an exemplary architectural flow diagram that illustrates program modules for implementing various embodiments of the Remote Display Generator, as described herein.

1.1 System Overview:

As noted above, the "Remote Display Generator," provides various techniques for providing high-fidelity displays with highly responsive interactive application experiences to clients across a wide range of network bandwidths for remotely hosted applications. The processes summarized above are illustrated by the general system diagram of FIG. 1. In particular, the system diagram of FIG. 1 illustrates the interrelationships between program modules for implementing various embodiments of the Remote Display Generator, as described herein. Furthermore, while the system diagram of FIG. 1 illustrates a high-level view of various embodiments of the Remote Display Generator, FIG. 1 is not intended to provide an exhaustive or complete illustration of every possible embodiment of the Remote Display Generator as described throughout this document.

In addition, it should be noted that any boxes and interconnections between boxes that may be represented by broken or dashed lines in FIG. 1 represent alternate embodiments of the Remote Display Generator described herein. Further, any or all of these alternate embodiments, as described below, may be used in combination with other alternate embodiments that are described throughout this document.

In general, as illustrated by FIG. 1, the processes enabled by the Remote Display Generator begin operation by connecting a server or host 100 to a client 110 across a network or Internet 120 for the purposes of allowing the client to display and/or interact with an application that is remotely hosted by the server. The server or host 100 generates a current display screen 130 (also referred to herein as a display frame) of the remotely hosted application and provides the current display screen to a frame compression and encoding module 145. The frame compression and encoding module 145 divides the current display screen into a set of relatively small pixel blocks having the same size, on the order of about 16×16 pixels.

The frame compression and encoding module 145 then compares corresponding pixel blocks of a buffered copy 140 of the immediately previous display frame 135 to the pixel blocks of the current display frame 130. This comparison allows the Remote Display Generator to determine which pixel blocks of the current display frame 130 have not changed relative to the previous display frame 135. Unchanged pixel blocks are marked as "SKIP" blocks, as described in further detail in Section 2.1, and are not further compressed or entropy coded, except to encode sufficient bits in the encoded screen image sent to the client to indicate to the client that specific pixel blocks are to remain unchanged relative to the previous display frame 135. Changed blocks are then compressed, using pixel block-based compression techniques that depend on a "type" of pixel block, with the compressed pixel blocks then being encoded for transmission to the client.

The server or host 100 then uses a server send module 150 to transmit the encoded pixel blocks of the current display frame 130 to the client 110 across the network or Internet 120. The client then uses a client receive module 155 to receive the encoded pixel blocks of the current display frame 130 transmitted from the server or host 100. The encoded pixel blocks of the current display frame 130 are then provided to frame decoding and decompression module 160 that first reverses the encoding performed by the server or host 100 to decode the pixel blocks of the current display frame. The decoding and decompression module 160 then selects unchanged pixel blocks of a buffered copy 165 of the same previous display frame 135 held by the server, and combines those unchanged pixel blocks with the decoded pixel blocks of the current display frame 130 to reconstruct a local copy of the current display frame. The local copy of the current display frame 130 is then rendered to the client 110 display device.

In order to allow the client 110 to interact with the application that is remotely hosted by the server, the client includes a client/server message module 170 that monitors user interaction (e.g., key presses, pointing device movement and selection, etc.) and reports that user interaction to the server via a client send module 175 across the network or Internet 120. A server receive module 180 receives user interaction reports or messages and provides those messages to an event handler module 185 which then causes the server or host 100 to change or update the current display frame, as if the user interaction had occurred locally on the server. The server or host 100 then compresses and encodes a new current frame for transmission to the client, as described above, with the above-described processes being iteratively repeated throughout the connection between the client 110 and server or host 100 during the remote application session.

2.0 Operational Details of the Remote Display Generator:

The above-described program modules are employed for implementing various embodiments of the Remote Display Generator. As summarized above, the Remote Display Generator provides various techniques for providing high-fidelity displays with highly responsive interactive application experiences to clients across a wide range of network bandwidths for remotely hosted applications. The following sections provide a detailed discussion of the operation of various embodiments of the Remote Display Generator, and of exemplary methods for implementing the program modules described in Section 1 with respect to FIG. 1. In particular, the following sections examples and operational details of various embodiments of the Remote Display Generator, including: a compression friendly model for compressing screen image pixel blocks; timer-driven screen updates; client-server interactivity; adaptive transmission mechanisms; screen compression; concurrent encoding for multiple clients; and exemplary uses for the Remote Display Generator.

2.1 Compression Friendly Model:

Conventional thin-client systems, such as VNC and THINC, provide screen updates to remote clients with arbitrary-size regions. This type of arbitrary-region-based mechanism allows the server to simply forward application-level "update regions" into the video compressors and discard the stable regions directly. At the client side, display instructions are then used to render single graphics primitives by providing a rectangle of pixels for a given region.

However, the update regions from some applications are usually small and in arbitrary positions, such as a menu or an edit box. Encoding these small regions independently tends to make the system suffer from compression-ratio degradation, even though various encoding schemes can be used. Furthermore, these small and arbitrary-size regions introduce heavy overhead bits to indicate their positions on the screen of the client, which further degrades compression performance.

Therefore, in contrast to the arbitrary-region-based architecture or conventional thin-client systems, the Remote Display Generator described herein employs a fixed-frame-based screen representation model. This model reads all the pixels of the screen from the framebuffer at one time and feeds the whole screen into the compressors and transmitters. Then, at the display side of the client, the display instruction acts to replace the whole screen with new pixels.

More specifically, in various embodiments of the Remote Display Generator, every screen frame fed into the compressor (server side) is segmented into regular non-overlapping blocks of pixels with the same relatively small size, on the order of about 16×16 pixels (see discussion below with respect to FIG. 2 for an example of pixel blocks). Note that while the pixel blocks described herein are generally discussed with respect to a block size of 16×16 pixels, it should be understood that block size and shape can be any size and shape desired so long as the pixel blocks are non-overlapping and cover the entire display area. The compressor (server side) and the de-compressor (client side) hold a copy of the previous whole frame internally, as discussed above with respect to FIG. 1. All the work for reducing redundancies between screens is performed based on the regular non-overlapping blocks. The Remote Display Generator employs a "SKIP block" mode and an "INTRA block" mode, as described in further detail below, to denote different block coding mechanisms.

In general, the SKIP block mode is used in various embodiments to identify the blocks that are exactly as same as the co-located blocks in the previous frame, and thus do not need to be updated for rendering the current frame on the client. Obviously, no further processing for SKIP blocks is needed, except that the entropy coder will include bits in the encoded bitstream for the current frame to inform the client to keep the corresponding block from the previous frame when rendering the current frame. Note also that as described in Section 2.4, SKIP blocks are also used in the context of various adaptive transmission embodiments to eliminate the need to encode or transmit blocks of pixels that are will be hidden or otherwise not visible on the client display for some reason (e.g., overlapping windows, screen size, etc.).

The INTRA block mode is used to exploit the inter-block redundancies, as described in further detail in Section 2.5. Although the screen is separated into regular blocks, the coefficients of INTRA-blocks in the whole screen are jointly entropy-coded. Consequently, more statistical redundancies can be utilized for compression. Further, the SKIP/INTRA-block mechanism described herein exploits inter/intra-frame redundancies with much finer granularity than conventional arbitrary-region-based scheme.

In addition, the SKIP/INTRA-block mechanism avoids redundant compression operations in the case of multiple-client connections (e.g., two or more clients connected to the same server running different instances of the same remotely hosted application). Since the screen update rate of each separate client may be different from that of other clients due to different access bandwidths, the previous screens held in the compressors are different for each client. As a result, the updated regions for the same screen are usually different for each client. However, as long as some blocks are the same between two or more clients, those particular "redundant" regions will be coded as INTRA-blocks.

Figure 2:
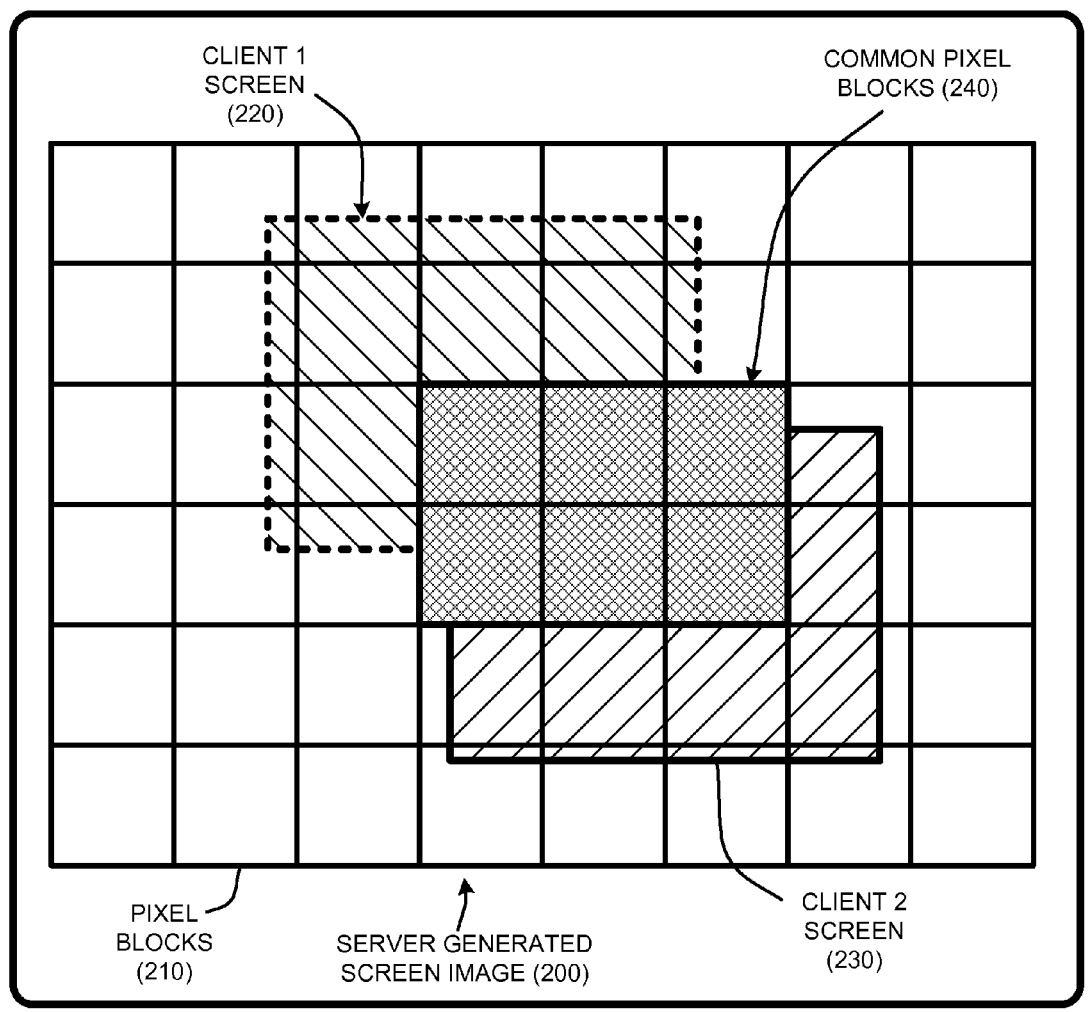
FIG. 2 provides an example of dividing a server generated screen image into a set of non-overlapping pixel blocks and a region of pixel blocks common to two different clients, as described herein.

For example, as illustrated by FIG. 2, a screen image 200 generated by server is divided into equal sized pixel blocks 210. In this example, a first client (i.e., "Client 1") will display a screen image 200 (shown as a shaded region) that represents a subsection of the screen image 200. Similarly, a second client (i.e., "Client 2") will display a screen image 230 (shown as a shaded region) that represents a different subsection of the screen image 200. However, as can be seen by FIG. 2, a set of pixel blocks, shown as shaded region 240, corresponds to an area of overlap between Client 1 screen image 220 and Client 2 screen image 230. Further, the pixel blocks of the overlap region, being the same for both Client 1 and Client 2, will be encoded only once and provided to both clients.

Note that as the number of clients increases, more blocks are likely to be the same for more clients, resulting in significantly reduced computational overhead with respect to pixel block compression, with the worst case being that every pixel block of the screen image 200 is encoded only once, regardless of the number of clients.

Figure 3:
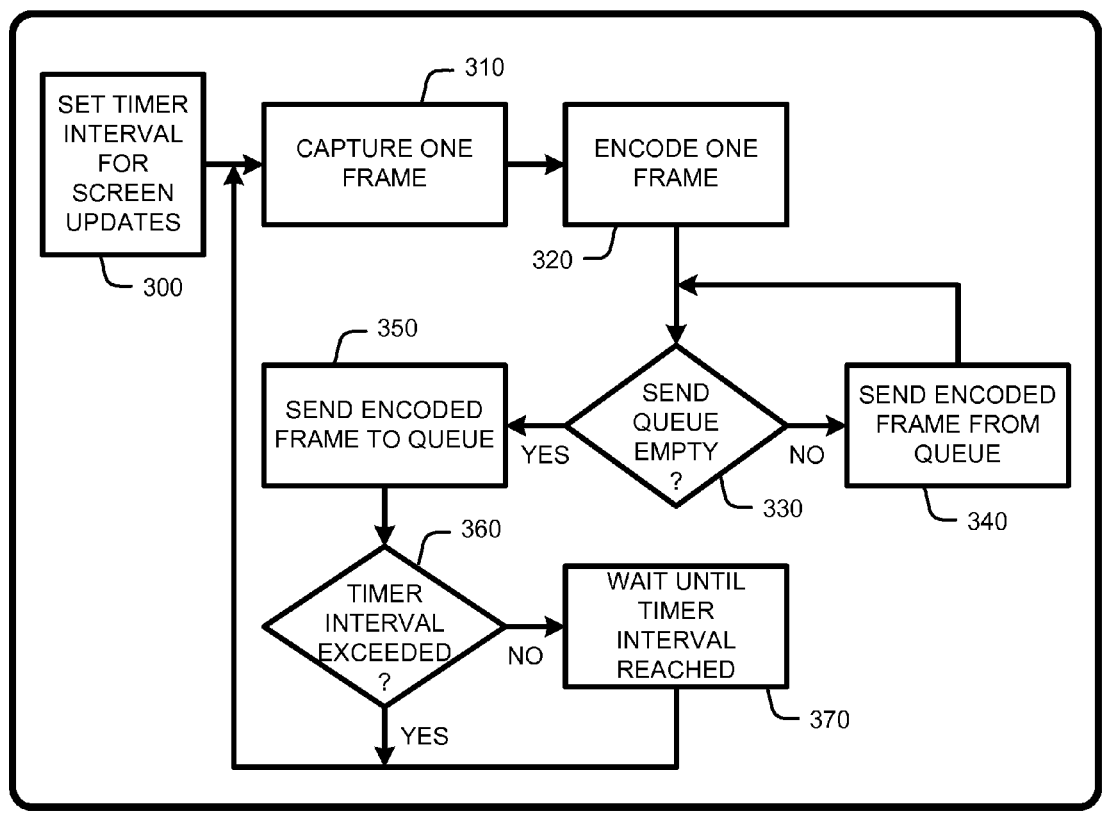
FIG. 3 provides an exemplary architectural flow diagram that illustrates a timer-driven screen update model for implementing various embodiments of the Remote Display Generator, as described herein.

2.2 Timer-Driven Screen Update:

Another problem addressed by various embodiments of the thin-client architecture provided by the Remote Display Generator is the screen update model for sending each screen image to the clients. In particular, in various embodiments, the Remote Display Generator employs a timer-driven model that controls how frequently client screens are to be updated. FIG. 3 illustrates the general workflow of the timer-driven screen update process. The minimal time interval of two captured consecutive frames is set 300 before screen updating begins. In general, this time interval is specified as a function of available bandwidth.

In various, this timer interval is set as high as possible, up to a maximum of the physical screen refresh rate (e.g., 60 hz for many conventional monitors or display devices), given the available bandwidth, with the idea being to provide a high enough refresh rate for display screens to provide an acceptable user interface experience. Note that during screen updating (on the client), the overall screen update process will wait until the sum of the time for one-frame capturing, encoding and sending reaches the pre-set time interval. In other words, after setting 300 the timer interval for screen updates (on a per-client basis), the server captures 310 or generates one frame. That frame is then encoded 320.

Next, if a send queue maintained by the server is not empty 330 when the frame is encoded 320, then the encoded frame is immediately transmitted 340 from the send queue to the client. However, if the send queue is empty 330, then the encoded frame is immediately sent 350 to the send queue. Then, a determination is made as to whether the time interval has been exceeded 360 (e.g., the total sum of the elapsed time from frame capture 310 and frame encoding 320 to sending 350 the encoded frame to the send queue). If the timer interval has not been exceeded 360, the system simply waits 370 until the timer interval has been reached, at which time, the overall process repeats, including frame capture 310, encoding 320, checking 330 the current contents of the send queue, etc., as described above, for the duration of the client connection to the server. In this manner, the Remote Display Generator uses the timer-constrained mechanism illustrated by FIG. 3 to avoid too frequent screen updates to the clients, thereby preserving as much of the presumably finite resources of the server (e.g., computing power, bandwidth, number of concurrent client connections allowed, etc.) as possible.

As noted above, the screen update process illustrated by FIG. 3 serves to set the time period for sending new screen images to the client. Clearly, these updated screens are continuously sent to the client (constrained by the timer interval for screen updates) during the period of the remote connection. Transmission of these screens to each client uses any conventional network communications protocol. However, it should be noted that checking 330 the contents of the send queue between screen updates and screen transmission to the client ensures that the send queue is always emptied before sending and encoding a new frame to avoid flooding the available bandwidth with bits corresponding to screen updates for the various clients.

2.3 Client-Server (C-S) Interactivity:

The thin-client system provided by the Remote Display Generator provides high-fidelity interactive experiences to users, with the intent being to provide the user with an experience similar to what the user would observe were the user to be running the remote application in his local computer instead on a remote server across the network or Internet.

In general, the interactive experience provided to the user depends on the response time and the interface usability over a wide range of client devices (e.g., notebook computer, handheld media player, cell phone, etc.). Consequently, to address the issue of widely varying client computing devices and bandwidth availability for different clients, the Remote Display Generator includes various techniques for maximizing the interactive user experiences with various computing devices.

TABLE 1, illustrated below, provides an example of client server messages for use in implementing the robust client-server interactivity enabled by the Remote Display Generator described herein.

TABLE 1

Exemplary Client-to-Server Messages

| C-S MESSAGE | DESCRIPTION |
| --- | --- |
| KEY | Input event of pressing/releasing one or more keys (e.g., function key, text string, etc., transmitted from the client to the server) |
| POINTER | Input event of clicking/moving the pointing device (e.g., pointer selection information, right click, left click, etc., transmitted from client to the server) |
| WINDOW-FIT | Input request of moving/resizing the active window to fully display in the visible rectangle |
| VISIBLE-RECTANGLE | Message to inform the server of the visible rectangle of the client (in pixels, e.g., 1024 × 768 pixel display or window size) |

The user input side of the thin-client system enabled by the Remote Display Generator is based on a standard desktop computer with a keyboard and a multi-button pointing device (or any other computing device with any conventional input mechanism used by such computing devices). In this case, the clients send the input events as client-to-server (C-S) messages (as described above with respect to FIG. 1) to the remote server when the user presses/releases a key in the keyboard (i.e., "KEY" message), or clicks/moves the pointing device (i.e., "POINTER" message). The contents of these messages simply let the server know what the user has typed, selected, or otherwise input via the keyboard and mouse (or other conventional input and pointing devices).

To address the involvement of heterogeneous devices having various display sizes and resolutions in ubiquitous computing environments, the thin-client system enabled by the Remote Display Generator employs a "WINDOW-FIT" client-to-server message, as listed in TABLE 1, to improve user experiences for various display sizes. In general, the WINDOW-FIT message is used to by the client to request the server to move/resize the current active window to be fully displayed on the visible rectangle of the client display. In general, the WINDOW-FIT message is sent to the client when users strike a predefined hotkey, or otherwise select or activate a menu item, requesting the WINDOW-FIT command. While this mechanism is relatively simple, it is quite useful when the client cannot display the whole screen in the original resolution rendered by the server.

Figure 4:
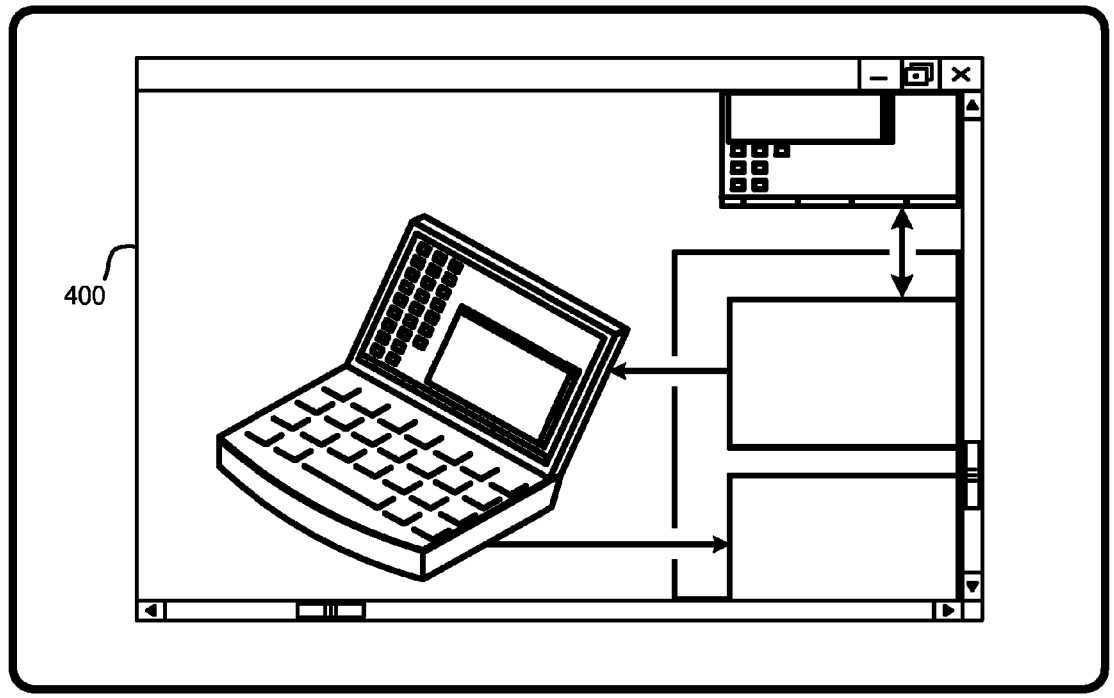
FIG. 4 provides an example of a server generated screen image that is too large to fit within a client display window, as described herein.
Figure 5:
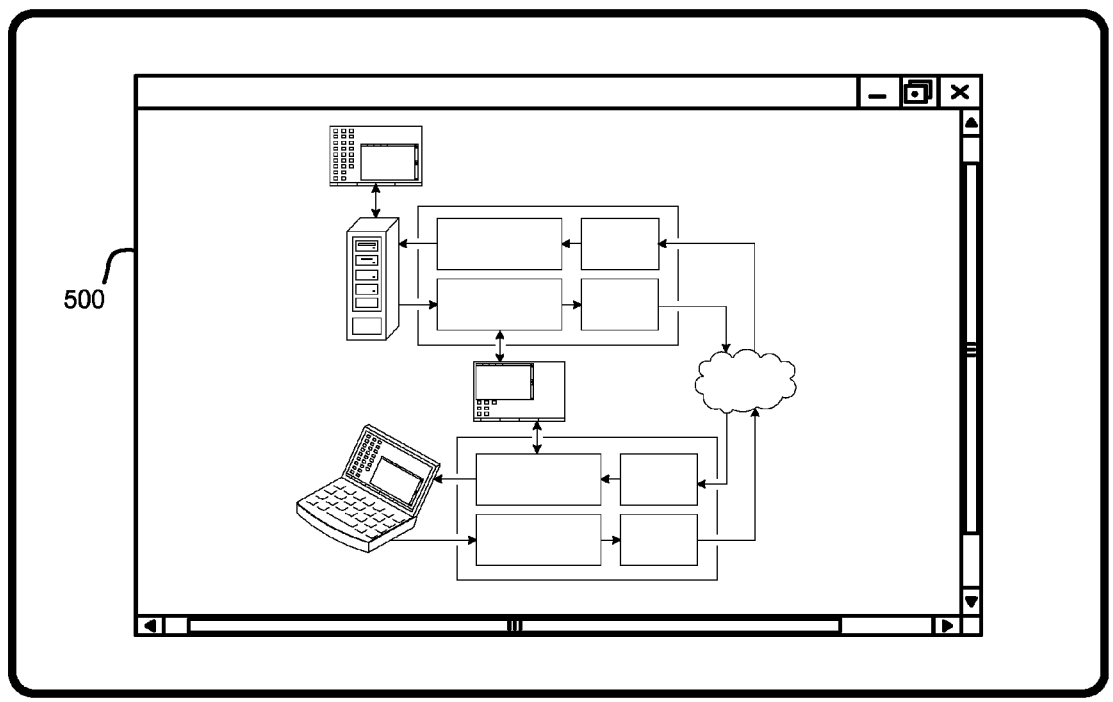
FIG. 5 provides an example of the server generated screen image of FIG. 4 following resizing by the server to fit into the client display window in response to a "WINDOW-FIT" message sent by the client to the server, as described herein.

FIG. 4 and FIG. 5 provide a simple example of using the WINDOW-FIT message in the thin-client system enabled by the Remote Display Generator. In particular, the server generates full resolution screen images (at some maximum desired resolution). In general, the maximum desired resolution can be a function of the attached client having the highest resolution of all attached clients, or can simply be any desired resolution. The full resolution screen image is then transmitted to each client. However, as shown in FIG. 4, only part of the screen image is visible in a window 400 on the client display device (with scroll bars or the like available to pan around the screen image in various embodiments). However, after the client sends the WINDOW-FIT request to the server, the server moves and resizes (in this case shrinks) the active window to cover the client-visible region, as shown in a window 500 of FIG. 5.

Finally, yet another client-to-server message employed by the Remote Display Generator is the "VISIBLE-RECTANGLE" message. The VISIBLE-RECTANGLE message is sent to the server from the client to inform the server of the size (i.e., pixel resolution) of the window or display being used by the client to display the screen images transmitted from the server to the client. However, in contrast to the other messages triggered by users (i.e. KEY, POINTER, and WINDOW-FIT), the VISIBLE-RECTANGLE message is automatically triggered by the internal logic of the client. In other words, if the display of the client is windowed, the VISIBLE-RECTANGLE will automatically inform the server of the size of the window (in pixels). Similarly, if the display of the client is not windowed, then the VISIBLE-RECTANGLE will simply inform the server of the size of the client display (in pixels).

In various embodiments of the Remote Display Generator, the client automatically determines whether the rectangle being painted (i.e., the client screen area being filled by the screen image transmitted by the client) has changed (size or position) relative to the previous rectangle. If so, the VISIBLE-RECTANGLE message will be sent to the server. Note that at the server side, the information provided with the VISIBLE-RECTANGLE for each client is not only used by the server in responding as with the WINDOW-FIT message (to resize/reposition the contents of the visible rectangle of the client), but is also used for various "adaptive transmission" embodiments of the Remote Display Generator, as described below in Section 2.4.

2.4 Adaptive Transmission:

An adaptive transmission mechanism is employed by the Remote Display Generator for the constrained-display case (i.e., the case where the full screen rendered by the server will not be visible on the client due to screen resolution, window size, overlapping windows covering part of the display, window zoom or magnification, etc.). In the case of a constrained display, as exemplified by FIG. 4, as discussed above, the invisible or hidden content is not necessary to be sent to the clients. Consequently, at the server side, only the pixels of the visible region are be processed and transmitted.

This adaptive transmission, where invisible or hidden pixel blocks are not encoded and transmitted to the client, is enabled using the above-described SKIP/INTRA-block mechanism. Note that a block is considered to be visible so long as at least one pixel of the block is visible on the client.

In particular, since the screen compression techniques provided by various embodiments of the Remote Display Generator are based on fixed size blocks (see discussion of FIG. 2 in Section 2.1), the position of the visible rectangle is converted to a map of blocks indicating whether a block is visible or not. Then, the visible-block map and the pixels are fed into the compressor. The compressor will treat the invisible blocks as SKIP blocks (i.e., a block that is not updated when redrawing the new current display frame on the client) and only one bit is used to represent one invisible block. As a result, both computational overhead and transmission bandwidth are reduced in the case of constrained displays (which is a common case for mobile devices such as cell phones, PDA's, portable media players, etc.). It should be noted that the adaptive transmission fully utilizes the block-based screen coding mechanism without breaking the frame coding architecture described herein.

2.5 Screen Compression:

The screen compression techniques described herein play a central role in the thin-client system enabled by the Remote Display Generator. Generally, the screens delivered by modern computers may contain a wide category of content including graphics, text, natural images, video, user-designed drawings, etc. The Remote Display Generator provides a unified screen compression scheme for various screen contents that is efficient and effective even for low-bandwidth networks. The following paragraphs describe an analysis of the characteristics of screen contents for implementing the screen codec described herein. Based on that analysis, subsequent paragraphs describe an efficient screen compression framework and various specially designed compression techniques.

2.5.1 Analysis for Screen Compression:

In general, high compression rates are achieved by the Remote Display Generator by exploiting data redundancies. As noted above, the block-based screen compression employs SKIP/INTRA-block modes to address inter- and intra-frame correlations. In various embodiments, SKIP-blocks are identified using a block-level difference detection process (i.e., directly compare the same block in the prior frame to the corresponding block in the current frame) and represented by one bit in the bitstream. As for the design of INTRA-block compression, an analysis of the characteristics of screen content are used in designing the screen codec used by the Remote Display Generator.

In particular, the diversity of screen contents for various applications and user interactions brings challenges to the design of a unified screen-encoding scheme. Typically, screen contents are classified as one of three types, including: 1) TEXT; 2) IMAGE; and 3) TEXT-ON-IMAGE. Note also that rather than encode the entire screen as one type, the individual pixel blocks are first identified as being one of the three types, with each pixel block then being encoded using a type-specific encoding process.

Figure 6:
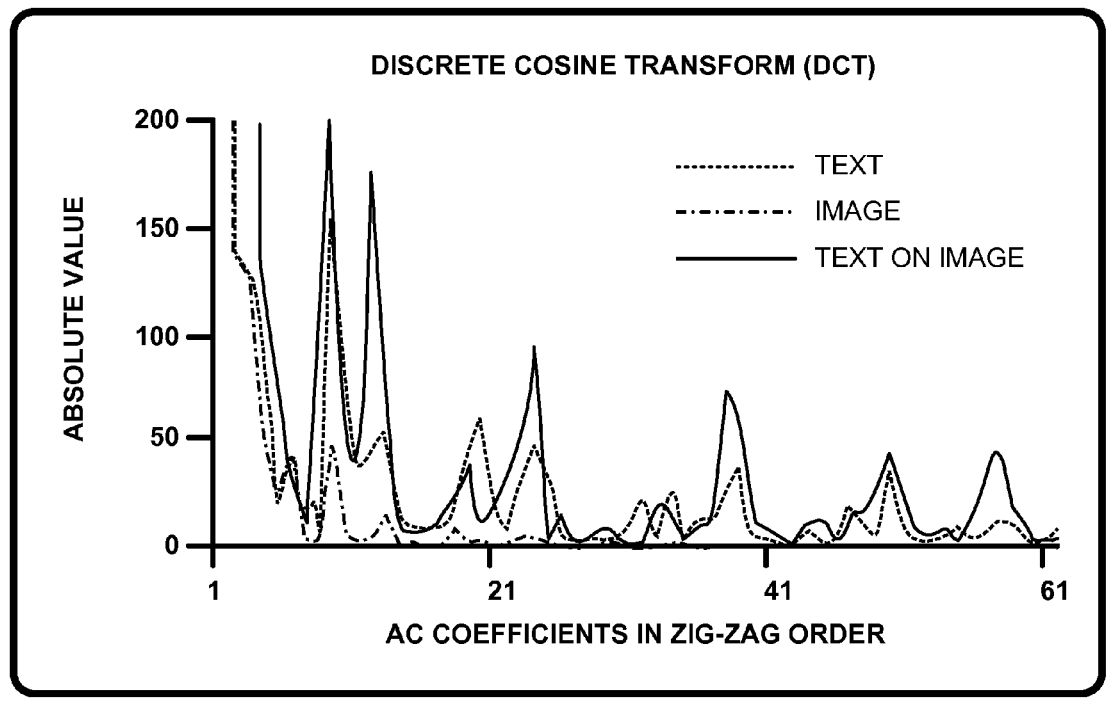
FIG. 6 provides an example of a discrete cosine transform (DCT) of various types of pixel blocks, as described herein.
Figure 7:
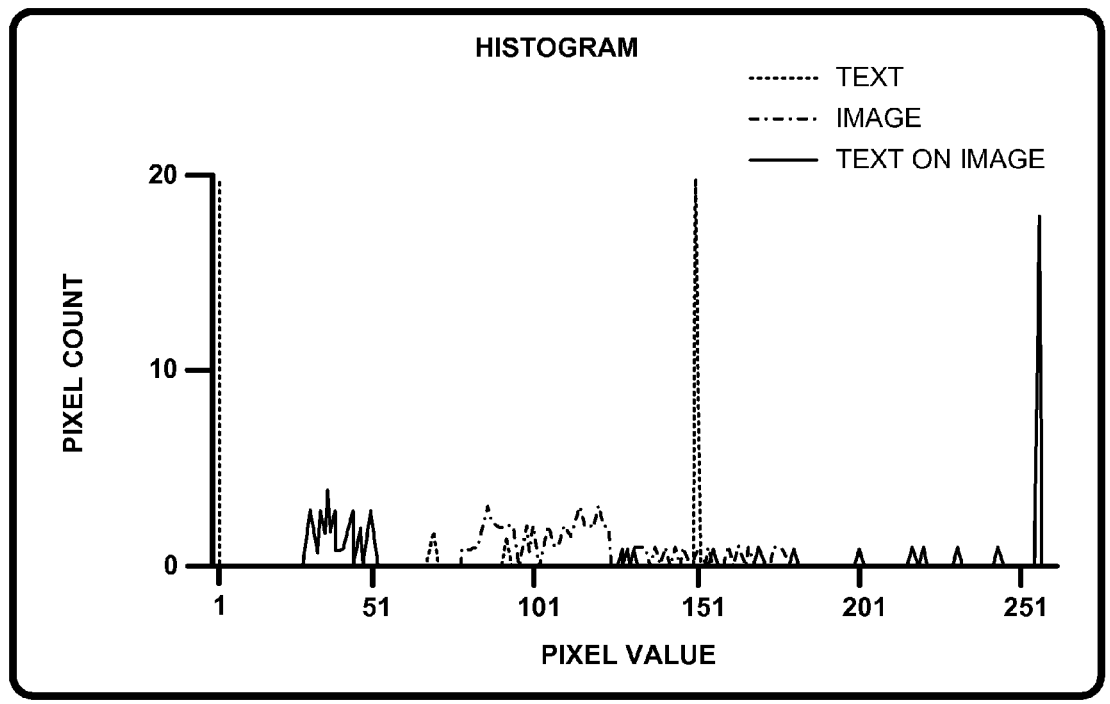
FIG. 7 provides an example of a histogram of pixel color values plotted against the total count of pixels for each color for various types of pixel blocks, as described herein.

These various content types exhibit different features not only in the pixel domain but also in the transform domain. For example, as illustrated by FIG. 6, the Discrete Cosine Transform (DCT), widely used in conventional image compression schemes, shows distinctly different distributions for the AC coefficients of the DCT of each of the three content types (i.e., TEXT, IMAGE, and TEXT-ON-IMAGE). For comparison purposes, histograms in the pixel domain for each of the three content types are also shown in FIG. 7.

In view of FIG. 6, it can be observed that IMAGE-type contents are compactly represented in the DCT domain. In fact, for IMAGE-type pixel blocks, only a few DCT coefficients at low frequencies are significant and high-frequency coefficients are almost zero. In the contrast, for TEXT-type pixel blocks, the energy is scattered into many DCT coefficients. However, in view of the histogram provided by FIG. 7, in the pixel domain, TEXT-type pixel blocks shows significant energy convergence, such that the pixel values of the whole TEXT-type pixel block can be represented by only a small number of pixel colors. Finally, for the TEXT-ON-IMAGE type pixel blocks, in the transform domain its energy is also scattered into many low- and high frequency coefficients, while in the pixel domain, the pixel values are also distributed into a small number of points. Consequently, the pixel values of the whole TEXT-ON-IMAGE type pixel block can also be represented by only a small number of pixel colors.

Based on these observations, adaptive compression mechanisms are employed by the Remote Display Generator to exploit inner-block redundancies for compound contents. In particular, for IMAGE blocks, the transform-domain representation mechanism is used like that in conventional image compression schemes such as JPEG. However, in contrast to the IMAGE blocks, a pixel-domain coding mechanism is provided for both TEXT blocks and TEXT-ON-IMAGE blocks. Note that if desired, a separate coding process specifically tailored to TEXT-ON-IMAGE blocks can also be used. However, it has been observed that in tested embodiments of the Remote Display Generator, the use of the pixel-domain coding mechanism for encoding both TEXT blocks and TEXT-ON-IMAGE blocks provided good results. See Section 2.5.4 for a discussion of the pixel-domain coding mechanism for TEXT blocks and TEXT-ON-IMAGE blocks.

Figure 9:
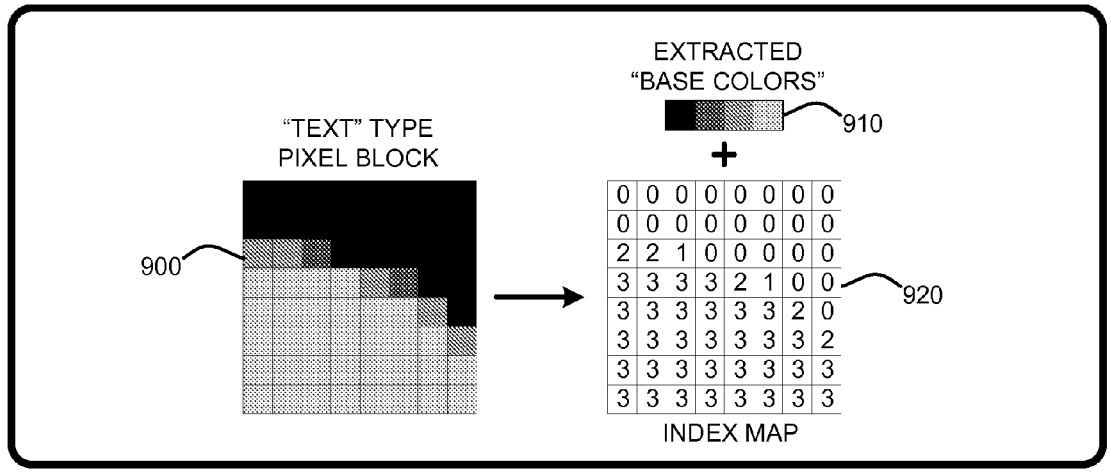
FIG. 9 provides an example of a TEXT type pixel block, showing a set of extracted "base colors" and a corresponding index map, as described herein.

In addition, in various embodiments of the Remote Display Generator, the concept of an "escaped pixel" coding mechanism is introduced for robust compression of TEXT blocks and TEXT-ON-IMAGE blocks, as described in further detail below in Section 2.5.4 with respect to FIG. 9.

2.5.2 Pixel Block Classification:

Generally, text/text-like content usually has sharp edges within blocks. Gradient is generally a good measurement of the edge sharpness. Consequently, in various embodiments of the Remote Display Generator, gradient values between the pixel and the surrounding pixels are first calculated for each individual pixel block. High-gradient values are selected through thresholding. Then, the pixels with high-gradient values within the block are counted. If the number of high-gradient pixels within the block exceeds a predefined threshold, then the block will be identified as a TEXT block, otherwise the pixel block will be identified as an IMAGE block. Note that this classification process will generally result in TEXT-ON-IMAGE blocks being identified as TEXT blocks.

In most cases, the block classification is accurate enough so that the overall rate can be significantly reduced compared to the scheme of employing a single block coding method. Even in the few cases that the classification is not accurate, the robust IMAGE and TEXT coding processes discussed below will ensure a high visual quality from reconstruction of the encoded blocks into the screen image. Further, the use of two different coding techniques based on block classification will only increase the number of bits used in these blocks by a small ratio. Overall, the block-type based screen codec described for use with the Remote Display Generator has been observed to provide a good trade-off between compression ratio and visual quality.

Figure 8:
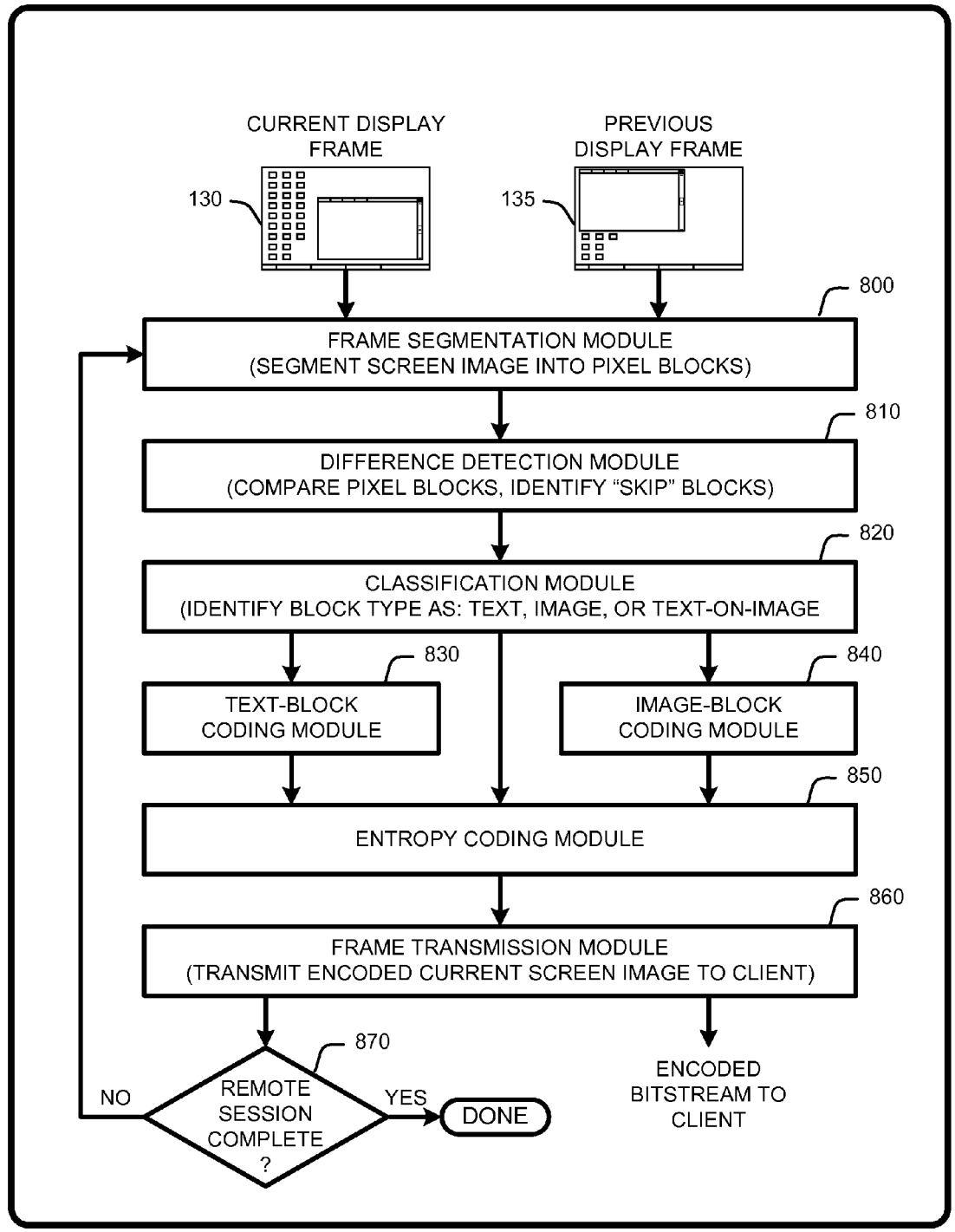
FIG. 8 provides a general system diagram which illustrates interrelationships between program modules for implementing various pixel block based encoding embodiments of the Remote Display Generator, as described herein.

2.5.3 Screen Codec Framework:

As noted above, a block-based screen compression process is used to implement the real-time thin-client system enabled by the Remote Display Generator. A diagram of the screen compression process enabled by the Remote Display Generator is shown in FIG. 8. In general, FIG. 8 provides a general system diagram which illustrates the interrelationships between program modules for implementing various embodiments of the Remote Display Generator, as described herein.

In particular, as illustrated by FIG. 8, the current screen image (i.e., current display frame 130) from the framebuffer of the server or remote host is provided to a frame segmentation module 800 which segments the current frame into non-overlapping 16×16 blocks (or fixed size blocks of any other desired size). In addition, the previous display frame 135 is also segmented into the same size non-overlapping blocks. Note that if the current display frame is the first screen image being sent to the client, there will not be a previous display frame 135. In addition, rather than repeat segmentation of the previous display frame 135, a copy of the segmented current display frame 130 can be temporarily buffered for use as the previous display frame 135 for the next iteration of frame encoding and transmission to the client.

In either case, once the current display frame 130 and previous display frame 135 have been segmented into pixel blocks a difference detection module 810 directly compares corresponding pixel blocks between the current and previous display frames. Any pixel block that has not changed in the current display frame 130 relative to the previous display frame 135 is identified as a SKIP block. As noted above, SKIP blocks are not updated on the client when redrawing the new current display frame on the client. Consequently, all non-changed blocks are identified is SKIP blocks and are not further processed except for identifying those blocks as SKIP blocks during the entropy coding process prior to transmitting the encoded current display frame 130 to the client.

Following the difference detection for identifying SKIP blocks, a classification module 820 evaluates each remaining pixel block (i.e., all blocks that are not SKIP blocks) to identify the type of each block as either an IMAGE block or a TEXT blocks. Note that as discussed above, TEXT-ON-IMAGE type blocks will be identified as TEXT type blocks for coding purposes, consequently, TEXT blocks include those blocks of pixels having text or text-on-image contents. For real-time purposes, the Remote Display Generator employs a simple but efficient block classification algorithm based on pixel gradients, as described above in Section 2.5.2.

The IMAGE blocks are then encoded in an IMAGE-block coding module 840 using any desired conventional compression techniques, such as, for example, JPEG compression. In the framework described herein for implementing various embodiments of the Remote Display Generator, the Remote Display Generator directly uses JPEG in the IMAGE block coding except the entropy coding part for purposes of explanation. However, it should be understood that any other desired coding technique can be use for IMAGE block coding without departing from the intended scope of the Remote Display Generator described herein. A pixel-domain coding algorithm, described in further detail in Section 2.5.4 is then used by a TEXT-block coding module 830 to encode all blocks of pixels identified as TEXT blocks. In general, this pixel-domain coding process represents TEXT blocks using several base colors in combination with an index map, as described in further detail in Section 2.5.4.

Next, a context-adaptive arithmetic coder is employed by an entropy coding module 850 for entropy coding of the compressed pixel blocks of both TEXT and IMAGE type. A frame transmission module 860 then transmits the encoded current screen image to the client. If the remote session between the server and client is complete 870 at this point, the process terminates. Otherwise, the processes described above repeat, beginning with segmentation of a new current display frame.

2.5.4 Text-Block Compression:

As noted above and as illustrated in FIG. 9, the TEXT block 900 representation of pixels consists of a set of base colors 910 extracted from the TEXT block in combination with an index map 920 which assigns one of the index colors to each pixel in the pixel block. In particular, base color extraction is associated with color quantization to minimize any potential display distortion based on the extracted limited-number of base colors. However, traditional color quantization methods, e.g., vector quantization and K-means, generally involve computationally expensive operations such as clustering processes that are not typically well suited for real-time operations such as those enabled by the thin-client processes of the Remote Display Generator. Therefore, considering the real-time character of thin-client interfaces, the Remote Display Generator directly extracts the base colors based on a histogram of the TEXT block. As discussed above with respect to FIG. 7 in Section 2.5.1, the histogram shown in FIG. 7, illustrates that a majority of pixels in both TEXT blocks and TEXT-ON-IMAGE blocks are convergent to a small number of colors or have color values that are very near this small number of colors.

Figure 10:
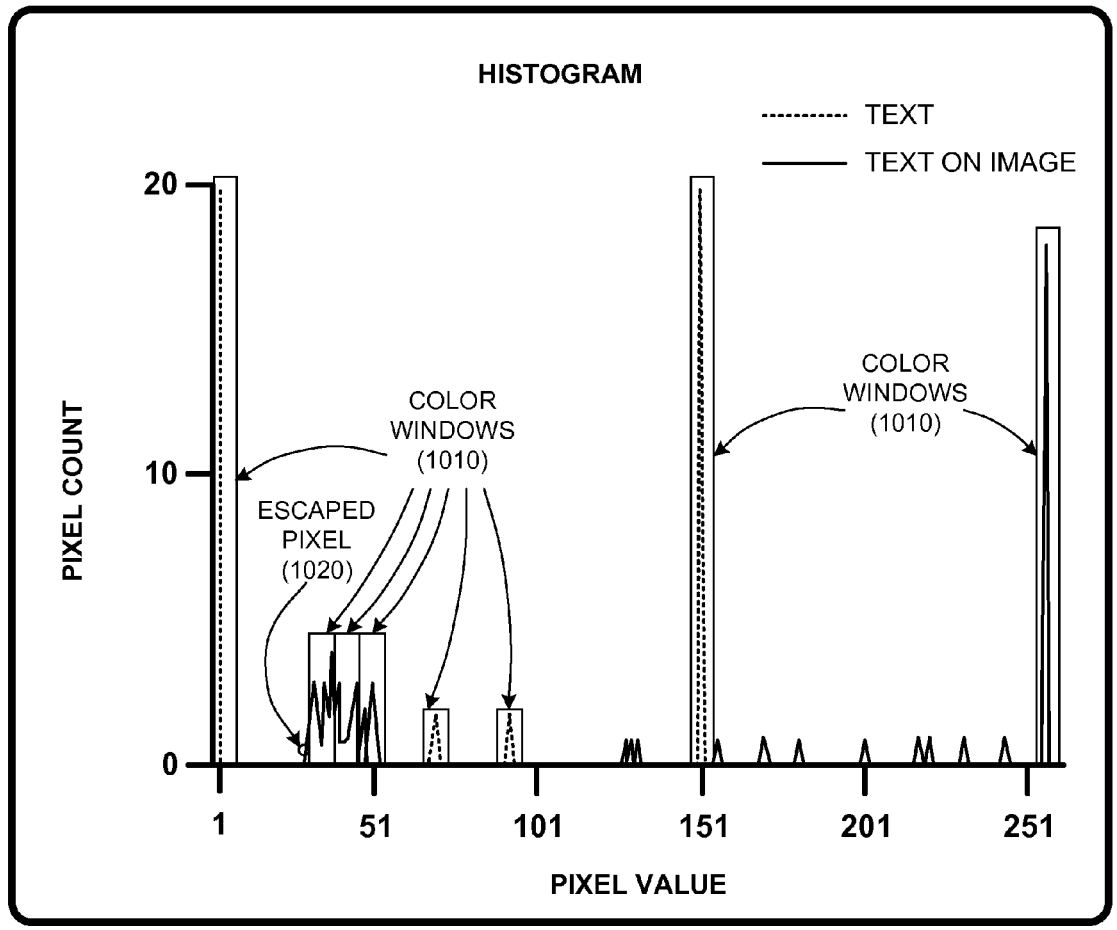
FIG. 10 provides an example of a histogram of pixel color values plotted against the total count of pixels for each color for various types of pixel blocks, with sets of "color windows" bounding a small set of dominant pixel values, as described herein.

Therefore, in various embodiments of the Remote Display Generator, the colors with peak histogram values (see FIG. 10) are selected as base colors. Then, equal-width "color windows" 1010 in the histogram is used to range the colors near the colors having peak histogram values, as shown in FIG. 10. All the pixels within the color window are then quantized to the base colors in the same window and are then represented by one index color. The result is a significant compression of TEXT blocks (based on a much smaller set of possible pixel colors) prior to encoding for transmission to the client. The resulting index map is then further compressed using run-length coding in the entropy coder prior to transmission to the client.

Note that as illustrated by FIG. 10, with any given TEXT block, it is possible that a small number of pixels will fall outside of one of the color windows 1010. Such pixels 1020 are referred to herein as "escaped pixels" since they are not caught or contained in any of the color windows 1010. In various embodiments, the Remote Display Generator uses PCM codes to directly represent escaped pixels in the bitstream. The result is a higher quality screen image when ultimately rendered on the client display.

2.6 Concurrent Encoding for Multiple Clients:

The processes described in Section 2.5 generally refer to a single client acting in connection with a single host. However, in view of the discussions provided herein, it should be clear that the Remote Display Generator supports connections between one host and one client, between one host and multiple clients, between multiple hosts and one client, and between multiple hosts and multiple clients.

In the case of connections between a single host and multiple clients, it is advantageous to reduce computational overhead on the host in order to service as many clients as possible. The screen encoding processes described in Section 2.5 are relatively time-consuming, especially when multiple client connections are considered. However, with a few modifications, the screen codec described above for use with the Remote Display Generator makes it possible to achieve low complexity encoding for multiple client connections.

For example, in the case of multiple connections to a plurality of clients all accessing the same process or application on the remote server or host, the various clients may have different frame rates due to the different network bandwidths or client display capabilities. Therefore, the Remote Display Generator runs an individual encoding session for each client connection even though each client is theoretically accessing the same application or process. However, the architecture of the screen codec of the Remote Display Generator makes it possible to have "partial one-pass encoding" of the current display frame to support multiple clients.

In particular, as discussed above with respect to FIG. 8, the overall encoding process for the current display frame can be separated into three general stages, including: 1) difference detection; block processing, and 3) entropy coding of compressed blocks. Therefore, for coding a particular frame for multiple clients, the difference detection may result in different SKIP/Non-SKIP maps, because these clients may have different previous frames. Further, for block processing, the main purpose is to select the coding mode and perform either TEXT block coding or IMAGE block coding. In operation, it has been observed that this block processing is the most time consuming and computationally expensive of the three general stages of the overall encoding process. However, since each block is separately processed during the overall encoding process, it is possible to implement one-pass block processing for all clients.

For example, as discussed above with respect to FIG. 1, both the encoder at the server and the decoder at the client maintain a copy of the identical previous frame. Considering the case of N clients connecting to one server, the Remote Display Generator allocates N buffers at the encoder, with each buffer maintaining a copy of the previous frame corresponding to each separate client. Given this framework, FIG.

11 provides a block diagram of the multi-client encoding enabled by the Remote Display Generator. In particular, for a current frame 1100 generated by the server, a separate copy of the previous frame (1105, 1110, and 1115) for each of the N clients is buffered or otherwise maintained by the server. Therefore, a separate difference detection process (1125, 1130, and 1135) is performed between the single current frame and each of the previous frames (1105, 1110, and 1115) relative to each client. Note that in this context, if a group of multiple clients are viewing exactly the same screens at the same time, that group will be treated as a single client for purposes of the encoding described below.

In some cases, a particular client may not have a current frame to encode, because the previous frame may still be under processing (e.g., transmission to the client or decoding at the client). In this case, all blocks in the entire current frame are marked as SKIP-blocks for that particular client. Otherwise, SKIP blocks are identified for each client based on the direct comparison of the blocks of the current frame 1100 to the previous frames (1105, 1110, and 1115). The SKIP/Non-SKIP maps in terms of these clients are then merged 1140 together to identify the union of all non-SKIP blocks for further encoding. In other words, some blocks may be SKIP blocks for all clients. Therefore, by merging 1140 the SKIP/Non-SKIP maps for all clients, no block that is a SKIP block for all clients will be encoded. Note that this process mirrors the basic SKIP block process for a single client described above in Section 2.1 and Section 2.4.

Figure 11:
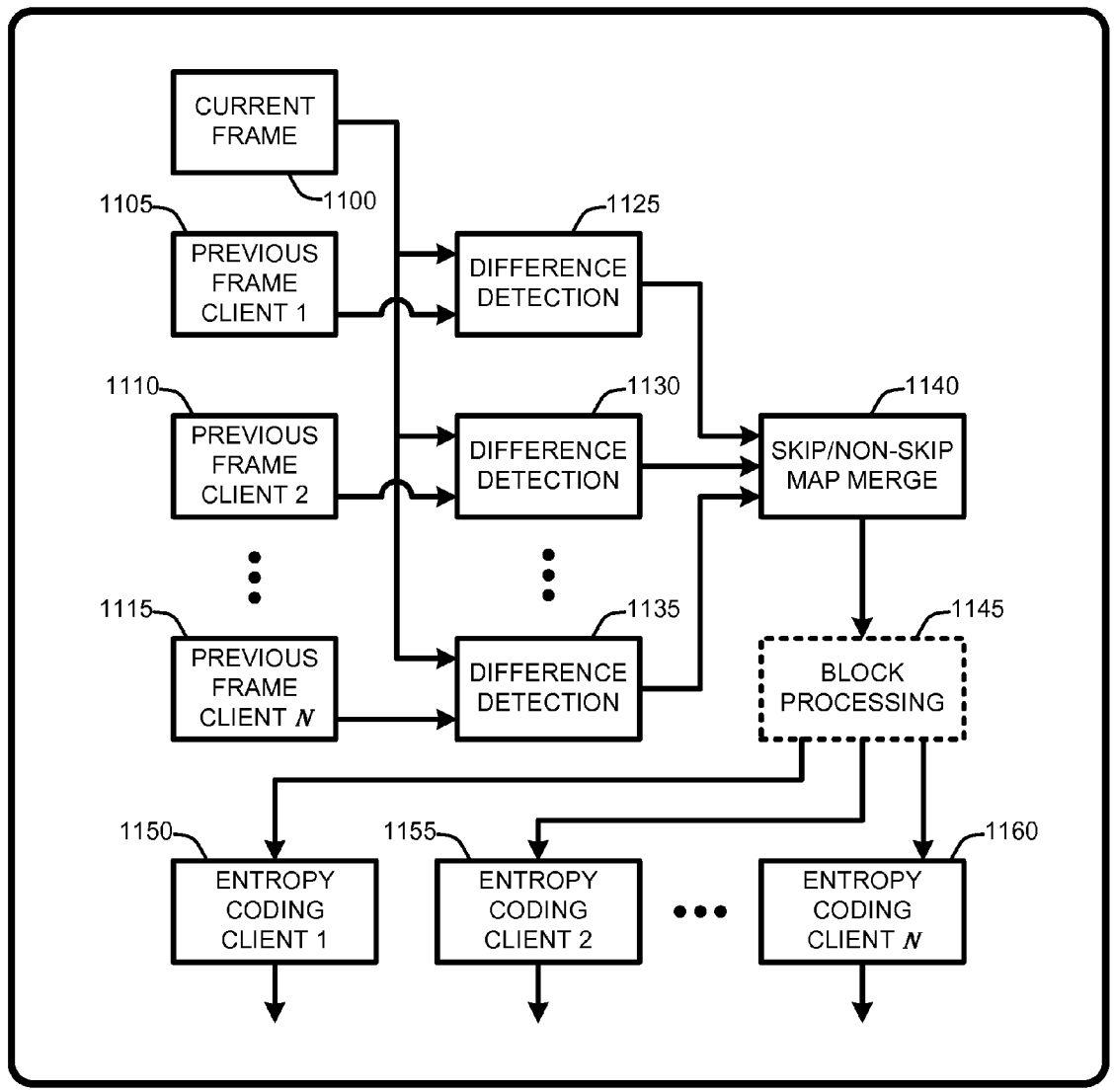
FIG. 11 illustrates a general block diagram of "multi-client encoding" for implementing various embodiments of the Remote Display Generator, as described herein.

Following the merging 1140 of the SKIP/Non-SKIP maps for all clients, the Remote Display Generator optionally performs block processing (as described in Section 2.5 with respect to classification and processing of TEXT and IMAGE blocks) for all Non-SKIP blocks. Note that even though block processing is the most time-consuming portion of the overall encoding process, the whole process can be performed as a one-pass encoding process using the process described with respect to FIG. 11. Finally, separate entropy coding (1150, 1155, and 1160) is performed to produce an output bit-stream representing the current frame for every client in terms of its own SKIP/Non-SKIP map.

Figure 12:
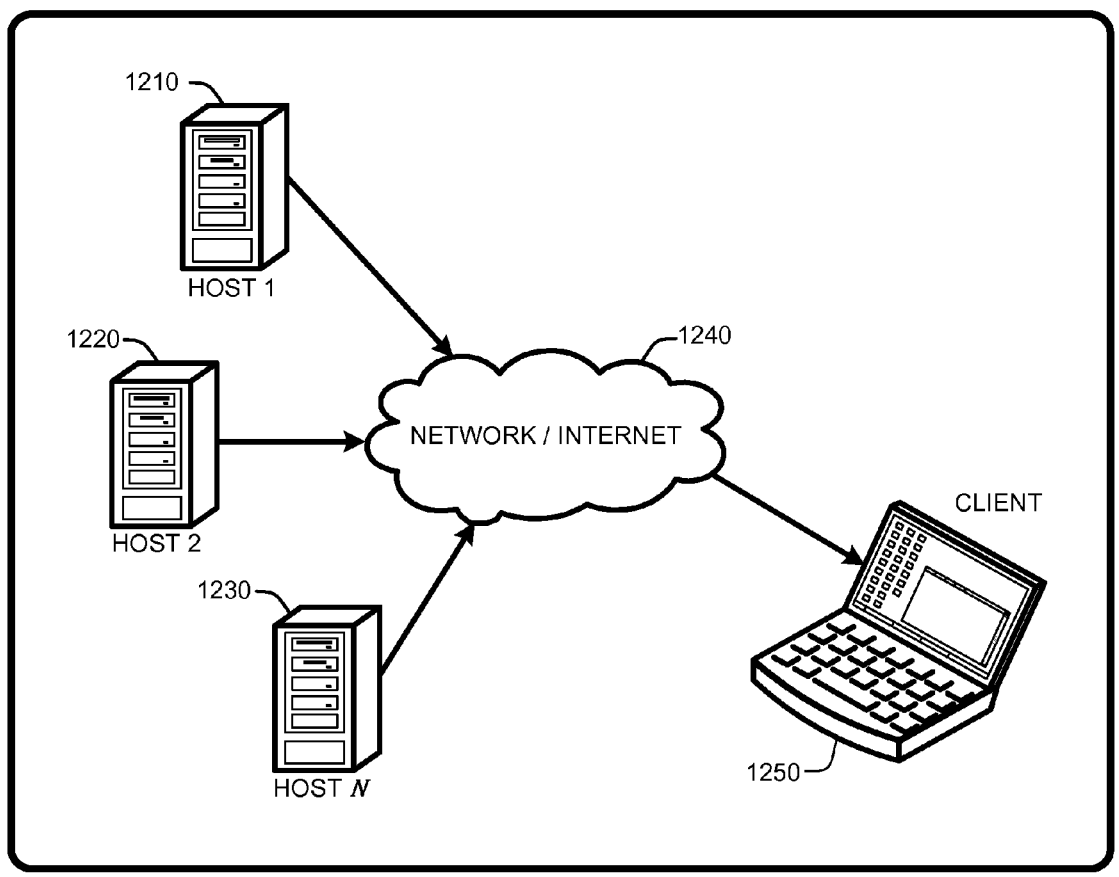
FIG. 12 depicts a typical remote connection architecture built upon the Remote Display Generator, including one client and multiple hosts/servers, as described herein.

2.7 Exemplary Uses for the Remote Display Generator:

The Remote Display Generator can enable many screen sharing and live communication scenarios. For example, one such use is the traditional remote desktop in the scenario of Software as a Service (SaaS). In this scenario, a typical problem is how to realize the remote software visualization. The Remote Display Generator provides a simple solution to this problem. In particular, FIG. 12 depicts a typical remote connection architecture built upon the Remote Display Generator, including one client and multiple hosts/servers. Each host/server (1210, 1220, and 1230) runs one or more applications, and transmits the related screen contents to the client 1250 via a conventional network or internet connection 1240. At the client 1250 side, the received screen contents can either compose a full desktop or be displayed separately in separate windows. Note that this is similar to the case of a client locally running multiple concurrent applications in separate windows, each of which may be fully or partially overlapped by other windows, minimized so that they are not currently displayed on the client desktop, or fully or partially moved off of the desktop so that the one or windows are not fully visible.

In general, when a client connects to multiple hosts, the client will perform three basic steps for each separate connection. In particular, at Step 1, the client will start a local desktop; at Step 2, the client will start an application from a remote host and display the received screen window on top of the local desktop; and at Step 3, the client starts another application from another remote host. It should be noted that Step 3 can cause one window or screen to fully or partially cover or obscure a prior screen image transmitted to the client. In principle, this is no different than when a client locally opens one application on the desktop and then opens two or more subsequent applications without closing the first application.

Considering that the client's behavior in resizing, moving, minimizing, and closing the various windows is unpredictable, a simple method is still to send the whole screen image from the corresponding host for each separate application. In order to make the regions outside the application invisible, an intuitive method is to send an alpha map to exclude the invisible region in the display. However, in view of the solution provided by the Remote Display Generator, such an alpha map is not needed. Instead, at the client, the Remote Display Generator displays the received screen in a window, whose size is exactly the same as the related application at the host. Then, the regions outside the application at the host automatically become invisible at the client. Recalling that the Remote Display Generator has an adaptive transmission strategy, it should be clear that SKIP-block coding is used to ensure that bits are not wasted to transmit these invisible screen contents.

Besides running the remote computing as a local desktop, the Remote Display Generator can also run the remote computing within a web browser type application, e.g., Internet Explorer® by Microsoft®. In this case, the Remote Display Generator is provided as a "plug-in" for the web browser. Since an Internet Explorer® process contains multiple tabs for multiple web connections, the Remote Display Generator can simulate multiple desktops by connecting to various remote hosts/servers. Each desktop will then compose a separate session in a separate Internet Explorer® tab.

Figure 13:
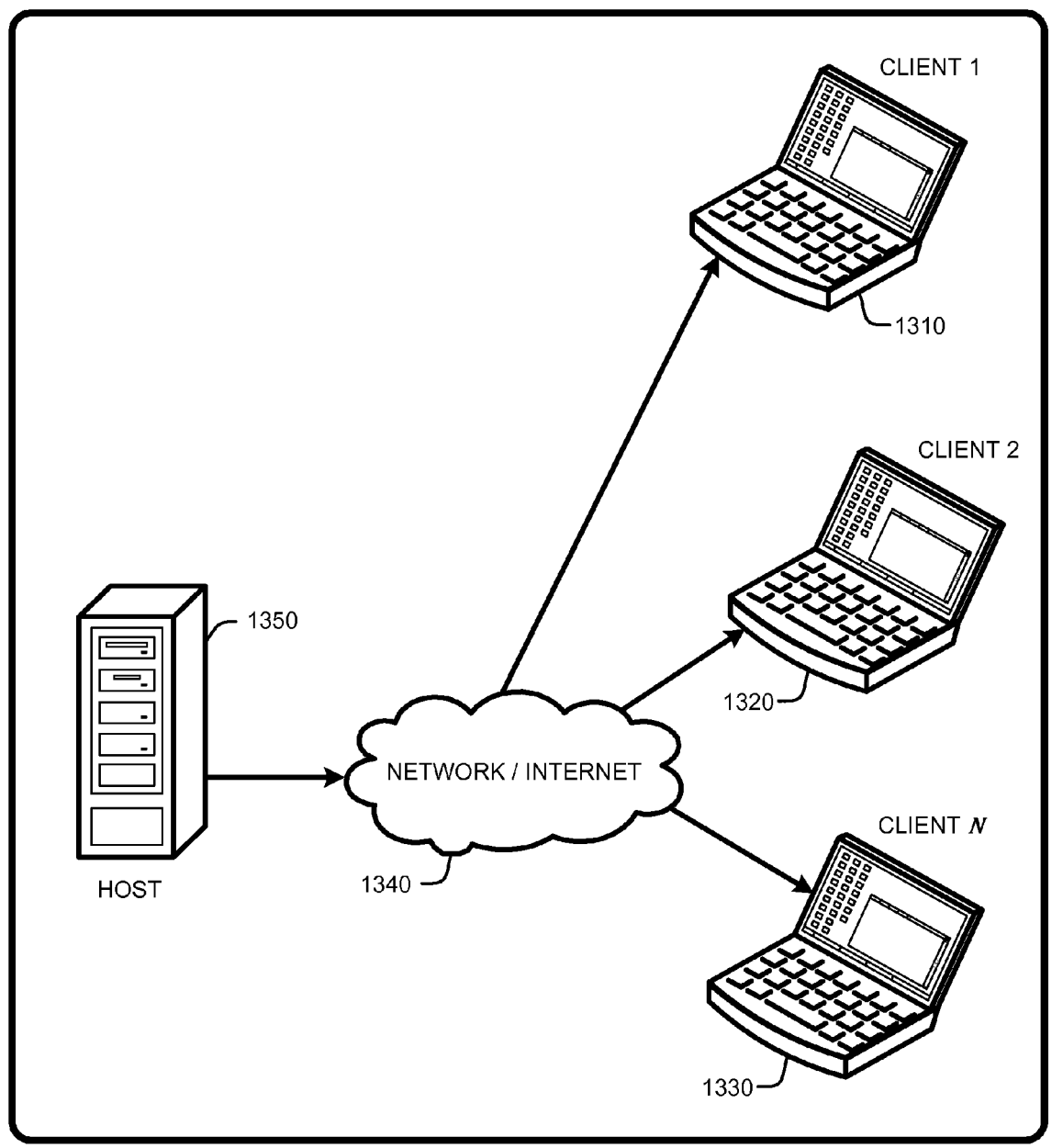
FIG. 13 illustrates use of the Remote Display Generator to allow a plurality of clients connected to a remote host via a network or internet connection to share the same screen contents, as described herein.

A second exemplary use for the Remote Display Generator involves screen sharing for meeting and collaborations. For example, as illustrated by FIG. 13, a number of clients (1310, 1320 and 1330) connect to a host 1350 via a conventional network or internet connection 1340. With this architecture, these clients (1310, 1320 and 1330) share the same screen contents. It should be noted that the frame rates of different clients may not be always the same due to the different processor capabilities and bandwidths, but the screen update remains synchronized among the different clients using the techniques described above in Section 2.6. In this case, one or many of the clients may own the control rights and can send back commands/messages to interact with or change the display using the techniques described above in Section 2.3 with respect to client-server interactivity. Note that in this case, the overall computational cost on the host side is relatively small, even in the case of a large number of clients. Consequently, a single user device, such as a conventional laptop type computer, will generally have sufficient computational capability (assuming sufficient bandwidth) to host a relatively large number of clients. In summary, this architecture is applicable in the scenario of online meeting and multi-client collaboration.

Figure 14:
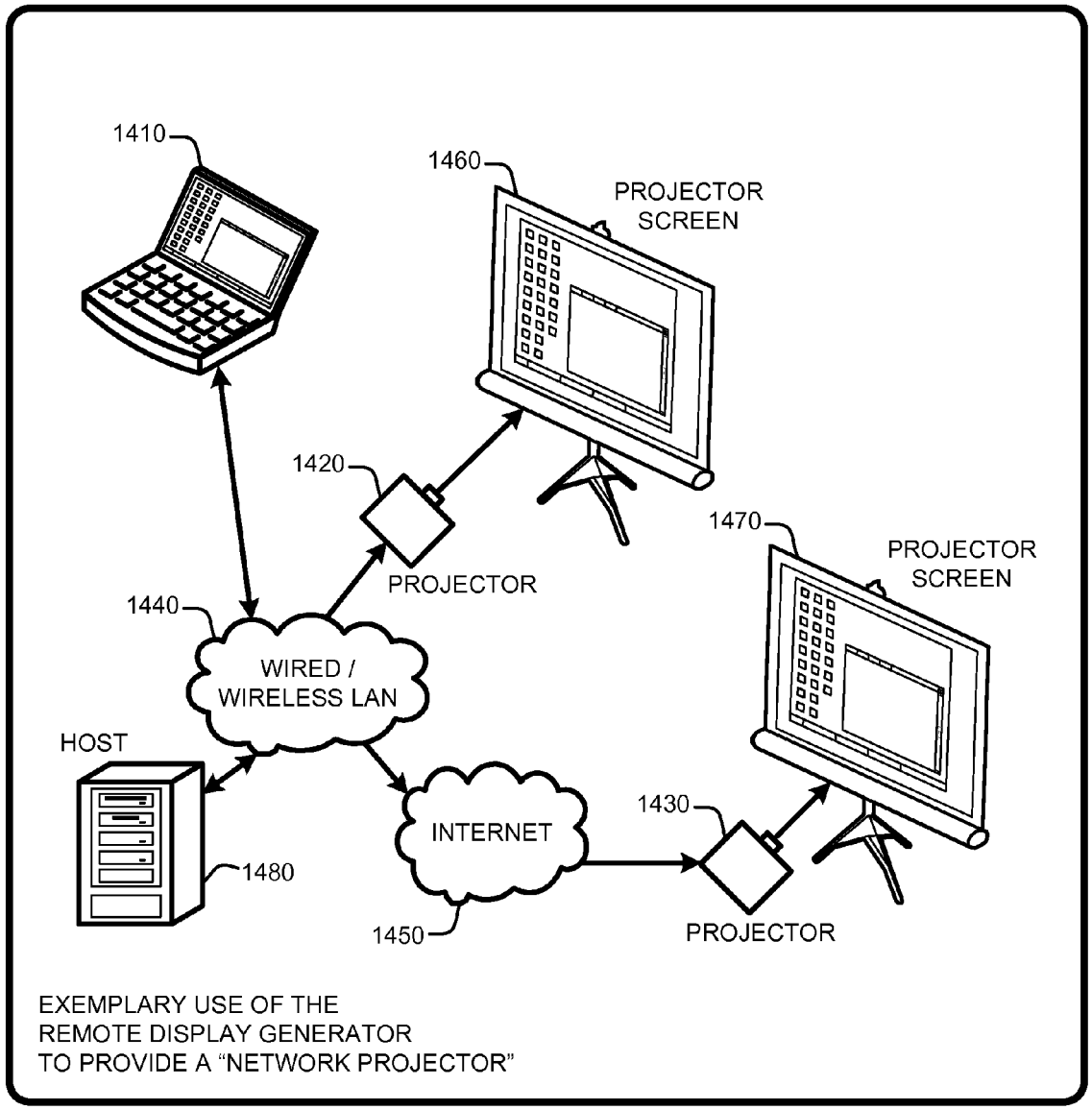
FIG. 14 illustrates an exemplary use of the Remote Display Generator to provide a "Network Projector", as described herein.

Besides remote desktop and screen sharing, the Remote Display Generator can also be used in many other scenarios. For example, FIG. 14 illustrates a scenario for enabling a "network projector" based on the Remote Display Generator. In this application, one user device 1410, such as a laptop, PDA, cell phone, etc., connects to one of more projectors (1420, 1430) through a wired/wireless LAN 1440 and/or Internet 1450. The projectors (1420, 1430) then simply decode and display the received screen contents of the user device 1410 on a corresponding projector screen (1460, 1470) or the like. It should be noticed that these projectors (1420, 1430) may have different network bandwidth and processing capabilities. Accordingly, these projectors may have different visual quality and frame rates in displaying the current screen sent by the user device 1410. However, because the Remote Display Generator natively supports multiple connections, as described above, the computational overhead for encoding at the host 1480 will not increase too much, thereby allowing a typical user device, such as an average notebook computer or the like to act as the host.

Figure 15:
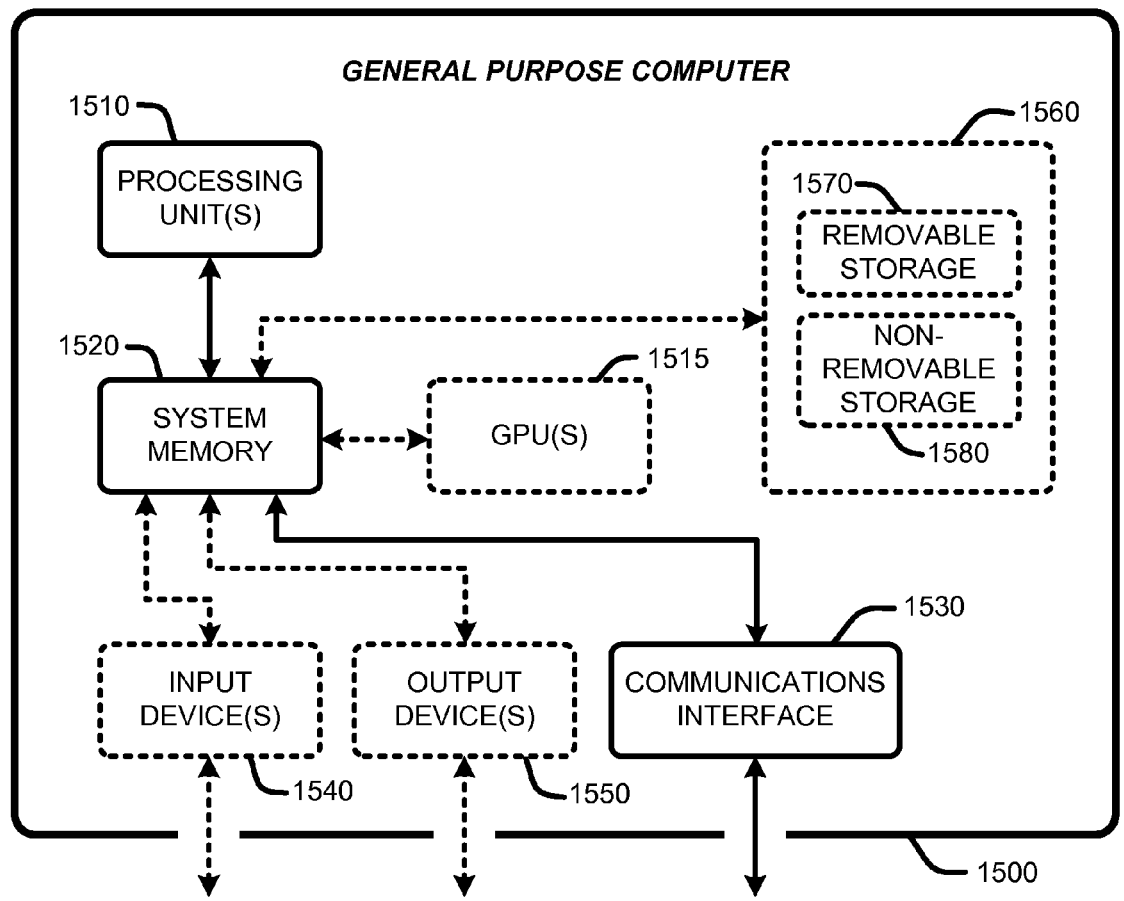
FIG. 15 is a general system diagram depicting a simplified general-purpose computing device having simplified computing and I/O capabilities for use in implementing various embodiments of the Remote Display Generator, as described herein.

3.0 Exemplary Operating Environments:

The Remote Display Generator described herein is operational within numerous types of general purpose or special purpose computing system environments or configurations. FIG. 15 illustrates a simplified example of a general-purpose computer system on which various embodiments and elements of the Remote Display Generator, as described herein, may be implemented. It should be noted that any boxes that are represented by broken or dashed lines in FIG. 15 represent alternate embodiments of the simplified computing device, and that any or all of these alternate embodiments, as described below, may be used in combination with other alternate embodiments that are described throughout this document.

For example, FIG. 15 shows a general system diagram showing a simplified computing device. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, video media players, etc.

To allow a device to implement the Remote Display Generator, the device includes a sufficient computational capability along with some way to communicate with other devices across a network or Internet. In particular, as illustrated by FIG. 15, the computational capability is generally illustrated by one or more processing unit(s) 1510, and may also include one or more GPUs 1515. Note that that the processing unit(s) 1510 of the general computing device of may be specialized microprocessors, such as a DSP, a VLIW, or other microcontroller, or can be conventional CPUs having one or more processing cores, including specialized GPU-based cores in a multi-core CPU.

In addition, the simplified computing device of FIG. 15 may also include other components, such as, for example, a communications interface 1530. The simplified computing device of FIG. 15 may also include one or more conventional computer input devices 1540. The simplified computing device of FIG. 15 may also include other optional components, such as, for example one or more conventional computer output devices 1550. Finally, the simplified computing device of FIG. 15 may also include storage 1560 that is either removable 1570 and/or non-removable 1580. Note that typical communications interfaces 1530, input devices 1540, output devices 1550, and storage devices 1560 for general-purpose computers are well known to those skilled in the art, and will not be described in detail herein.

The foregoing description of the Remote Display Generator has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Remote Display Generator. It is intended that the scope of the invention be limited not by this detailed description, but rather by the claims appended hereto.

What is claimed is:

1. A computer-implemented process for displaying screen images of a remotely hosted application on a client display device, comprising:
    using a remote host computer to perform process actions for:
    establishing network connections between one or more clients and the remote host;
    initiating one or more applications on the remote host for each client;
    generating a current screen image for each client for each corresponding application;
    dividing each current screen image into a set of non-overlapping blocks of pixels;
    comparing the blocks of pixels of each current screen image to corresponding blocks of pixels from an immediately previous screen image for each client to identify unchanged blocks of pixels in each current screen image;
    compressing all unchanged blocks of pixels of each current screen image;
    encoding the compressed blocks of pixels for each current screen image; and
    transmitting the encoded compressed blocks for the current screen image for each corresponding application to each corresponding client for use by each client for: decoding the encoded compressed blocks, decompressing the decoded blocks of pixels, reconstructing each received current screen image and displaying the reconstructed current screen images received by each of those clients.

2. The computer-implemented process of claim 1 wherein compressing all unchanged blocks of pixels of each current screen image further comprising process actions for:
    evaluating each unchanged block of pixels and classifying each of those blocks as a text-type block or as an image-type block; and
    applying a different block-specific compression to each block type to compress the unchanged blocks of pixels.

3. The computer-implemented process of claim 2 wherein the block-specific compression applied to text-type block includes process actions for:
    evaluating text-type blocks to identify a small number of dominant pixel colors for the pixels in the text-type block; and
    quantizing the pixels in the text-type block to the small number of dominant pixel colors.

4. The computer-implemented process of claim 1 further comprising process actions for setting a separate predefined screen update time for each client as a function of available client bandwidth.

5. The computer-implemented process of claim 1 further comprising process actions for:
    locally monitoring client interactions with the screen image; and
    reporting the monitored client interactions to the host.

6. The computer-implemented process of claim 5 wherein subsequent current screen images transmitted to each client from the host are rendered by the host to reflect the monitored client interactions reported to the host.

7. The computer-implemented process of claim 1 further comprising process actions for allowing any client to send a request message to the host to cause the host to resize the current screen image to fit within an available display area on the requesting client.

8. The computer-implemented process of claim 1 further wherein identifying unchanged blocks of pixels in each current screen image further comprises process actions for generating a "skip map" that indicates the specific blocks of pixels that have not changed for each corresponding current screen image, and wherein each corresponding skip map is transmitted to each corresponding client.

9. The computer-implemented process of claim 8 wherein each client uses any received skip maps to select corresponding unchanged blocks of pixels from a local copy of each an immediately previous screen image for use in reconstructing each received current screen image.

10. A system for generating screen images of a remotely hosted application on a client display device, comprising using a remote server for:
- executing an application and rendering a current screen image of the application;
- dividing the current screen image into a set of non-overlapping pixel blocks of equal size;
- comparing the pixel blocks of the current screen image to corresponding pixel blocks of a buffered copy of a previous screen image for the application;
- creating a map of pixel blocks that are unchanged from the previous screen image to the current screen image;
- compressing all unchanged pixel blocks of the current screen image;
- encoding the compressed pixel blocks and the map of unchanged pixel blocks into a composite bitstream; and
- transmitting the composite bitstream to the client.

11. The system of claim 10 further comprising using the client to decode, decompress, render and display the current screen image on a client display device.

12. The system of claim 11 wherein rendering the current screen image further comprises using the map of unchanged pixel blocks to select corresponding unchanged pixel blocks from a local copy of the previous screen image and combining those unchanged pixel blocks with the decompressed pixel blocks recovered from the composite bitstream to render the current screen image.

13. The system of claim 10 wherein compressing all unchanged pixel blocks of the current screen image further comprises first evaluating each unchanged pixel block and classifying each of those blocks as a text-type block or as an image-type block.

14. The system of claim 13 wherein text-type pixel blocks are compressed by identifying a small number of the most dominant pixel colors in the text-type block and quantizing the pixels in the text-type block to those dominant pixel colors.

15. The system of claim 10 further comprising locally monitoring client interactions with the current screen image and reporting the monitored client interactions to the server.

16. The system of claim 15 wherein subsequent current screen images transmitted to the client are rendered by the server to reflect the monitored client interactions reported to the server.

17. A computer-readable medium having computer executable instructions stored therein for displaying remotely hosted applications on a local client, said instructions causing a computing device to execute a method comprising:
- executing an application and rendering a current screen image of the application;
- dividing the current screen image into a set of non-overlapping pixel blocks of equal size;
- comparing the pixel blocks of the current screen image to corresponding pixel blocks of a buffered copy of a previous screen image for the application;
- creating a map of pixel blocks that are unchanged from the previous screen image to the current screen image;
- compressing all unchanged pixel blocks of the current screen image;
- encoding the compressed pixel blocks and the map of unchanged pixel blocks into a composite bitstream; and
- transmitting the composite bitstream to the client.

18. The computer-readable medium of claim 17 further comprising computer-executable instructions for using the client to decode, decompress, render and display the current screen image on a client display device.

19. The computer-readable medium of claim 18 wherein rendering the current screen image further comprises using the map of unchanged pixel blocks to select corresponding unchanged pixel blocks from a local copy of the previous screen image and combining those unchanged pixel blocks with the decompressed pixel blocks recovered from the composite bitstream to render the current screen image.

20. The computer-readable medium of claim 17 wherein compressing all unchanged pixel blocks of the current screen image further comprises:
- first evaluating each unchanged pixel block and classifying each of those blocks as a text-type block or as an image-type block; and
- compressing text-type pixel blocks by identifying a small number of the most dominant pixel colors in the text-type block and quantizing the pixels in the text-type block to those dominant pixel colors.

* * * * *